United States Patent
Delehouze et al.

(10) Patent No.: US 11,530,166 B2
(45) Date of Patent: Dec. 20, 2022

(54) METHOD FOR PRODUCING A PYROLYTIC CARBON WITH PREDETERMINED MICROSTRUCTURE

(71) Applicants: SAFRAN CERAMICS, Le Haillan (FR); CENTRE NATIONAL DE LA RECHERCHE SCIENTIFIQUE, Paris (FR); COMMISSARIAT A L'ENERGIE ATOMIQUE ET AUX ENERGIES ALTERNATIVES, Paris (FR)

(72) Inventors: Arnaud Delehouze, Moissy-Cramayel (FR); Amandine Lorriaux, Bordeaux (FR); Laurence Maille, Bordeaux (FR); Patrick David, Paris (FR)

(73) Assignees: SAFRAN CERAMICS, Le Haillan (FR); CENTRE NATIONAL DE LA RECHERCHE SCIENTIFIQUE, Paris (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 370 days.

(21) Appl. No.: 16/756,765

(22) PCT Filed: Oct. 18, 2018

(86) PCT No.: PCT/FR2018/052606
§ 371 (c)(1),
(2) Date: Apr. 16, 2020

(87) PCT Pub. No.: WO2019/077284
PCT Pub. Date: Apr. 25, 2019

(65) Prior Publication Data
US 2021/0188641 A1 Jun. 24, 2021

(30) Foreign Application Priority Data

Oct. 19, 2017 (FR) ...................................... 1759870

(51) Int. Cl.
*C04B 35/83* (2006.01)
*C04B 35/52* (2006.01)
(Continued)

(52) U.S. Cl.
CPC .............. *C04B 35/83* (2013.01); *C01B 32/05* (2017.08); *C04B 35/521* (2013.01); *C04B 35/80* (2013.01);
(Continued)

(58) Field of Classification Search
CPC ..... F16D 2200/0047; F16D 2200/0091; F16D 9/023; B01J 37/084; B01J 21/18;
(Continued)

(56) References Cited

U.S. PATENT DOCUMENTS

| 4,544,599 A | 10/1985 | Buttazzoni |
| 6,410,088 B1 | 6/2002 | Robin-Brosse et al. |

FOREIGN PATENT DOCUMENTS

| CN | 101439981 A | 5/2009 |
| DE | 10 2012 005088 A1 | 9/2013 |

(Continued)

OTHER PUBLICATIONS

Yan, X., et al., "Exploratory Research on Preparation of C/C Composites by Ethanol Pyrolysis," New Carbon Materials, vol. 23, No. 4, Dec. 2008, pp. 314-318 (no English equivalent—Abstract in English; brief explanation of relevance on p. 4 of the English translation of the Chinese Office Action).

(Continued)

*Primary Examiner* — Camie S Thompson
(74) *Attorney, Agent, or Firm* — Pillsbury Winthrop Shaw Pittman LLP

(57) ABSTRACT

A process for manufacturing pyrocarbon, includes forming pyrocarbon by a calefaction process from at least one $C_2$ to $C_6$ alcohol or polyalcohol precursor, the precursor being ethanol, rough laminar pyrocarbon being obtained by imposing a temperature of between 1250° C. and 1325° C. during calefaction.

3 Claims, 1 Drawing Sheet

(51) Int. Cl.
  *C04B 35/80* (2006.01)
  *C01B 32/05* (2017.01)
(52) U.S. Cl.
  CPC .............. *C04B 2235/5224* (2013.01); *C04B 2235/5244* (2013.01); *C04B 2235/5248* (2013.01)
(58) Field of Classification Search
  CPC .. B01J 35/06; C08J 7/04; C23C 16/26; C23C 16/545; C23C 16/0272; C23C 16/22; C23C 18/143; C23C 18/1291; C23C 18/1245; C23C 18/1229; C23C 18/12; C04B 41/52; C04B 41/4556; C04B 35/83; C04B 35/80; C04B 35/62873; C04B 35/521; C04B 2235/616
  USPC .............................. 423/445 R; 427/226, 228
  See application file for complete search history.

(56) References Cited

FOREIGN PATENT DOCUMENTS

| JP | 2000-143368 A | 5/2000 |
|---|---|---|
| WO | WO 2006/136755 A2 | 3/2006 |

OTHER PUBLICATIONS

First Office Action as issued in Chinese Patent Application No. 201880066699.8, dated Feb. 7, 2022.
International Search Report as issued in International Patent Application No. PCT/FR2018/052606, dated Jan. 30, 2019.
Database Compendex [Online], Feb. 2011, Liu, Z-C., et al., "Microstructures and mechanical behavior of C/C composites prepared by ICVI using n-propanol asprecursor," XP002787693, Database accession No. E20111313874524.
Regiani, I., et al., "Differences in Pyrocarbon Matrices Made by FB-CVI with Organic Precursors," Dec. 2014, pp. 237-244.
Wei, L., et al., "Densification and microstructure of carbon/carbon composites prepared by chemical vapor infiltration using ethanol as precursor," Science China, Technological Sciences, vol. 53, No. 8, Aug. 2010, pp. 2232-2238.
Li, A., et al., "Chemistry and kinetics of chemical vapor deposition of pyrolytic carbon from ethanol," Science Direct, Proceedings of the Combustion Institute, vol. 33, (2011), pp. 1843-1850.
Second Office Action as issued in Chinese Patent Application No. 201880066699.8, dated Aug. 15, 2022.
Lewis, et al., "Tissue structure and mechanical properties of the ICVI preparation of CIC composites of n-propanol," Journal of Inorganic Materials, vol. 26, No. 2, pp. 191-196, Feb. 2011.
Notice of Reasons for Refusal as issued in Japanese Patent Application No. 2020-522005, dated Sep. 6, 2022.

METHOD FOR PRODUCING A PYROLYTIC CARBON WITH PREDETERMINED MICROSTRUCTURE

CROSS-REFERENCE TO RELATED APPLICATIONS

This application is the U.S. National Stage of PCT/FR2018/052606, filed Oct. 18, 2018, which in turn claims priority to French patent application number 1759870 filed Oct. 19, 2017. The content of these applications are incorporated herein by reference in their entireties.

BACKGROUND OF THE INVENTION

It is known to use the calefaction technique to form pyrocarbon from a hydrocarbon precursor such as cyclohexane.

It is possible, in particular, to deposit a pyrocarbon coating on the outer surface of a substrate by calefaction by immersing said substrate in a bath of cyclohexane in the liquid state, and heating said substrate to a temperature above the decomposition temperature of the precursor.

The liquid, on contact with hot surfaces, vaporizes and forms a gaseous film called the "calefaction film". As the substrate is heated above the decomposition temperature of the precursor, the vapors contained in the calefaction film decompose and a deposit is formed by heterogeneous reactions between the surface of the substrate and the gas phase.

However, it is relatively difficult to control the microstructure of the pyrocarbon formed and to obtain a homogeneous microstructure when known calefaction techniques are used. More particularly, the controlled production of rough laminar type pyrocarbon can be relatively difficult. Furthermore, pyrocarbon obtained by calefaction in the prior art may have structural defects, such as cracks, the degree of presence of which should be reduced.

Another problem is that known calefaction precursors are generally derived from non-renewable resources (oil, for example). This can eventually lead to problems of availability of these compounds and negative environmental impact.

SUBJECT MATTER AND SUMMARY OF THE INVENTION

The invention aims to resolve the aforementioned drawbacks and concerns a process for manufacturing pyrocarbon, comprising a step of forming pyrocarbon by a calefaction process from at least one $C_2$ to $C_6$ alcohol or polyalcohol precursor.

"Alcohol" means a compound with a single alcohol function. "Polyalcohol" means a compound with several alcohol functions.

The use of a $C_2$ to $C_6$ alcohol or polyalcohol precursor makes it possible to obtain a pyrocarbon with a homogeneous and controlled microstructure, and with fewer structural defects compared with prior art techniques. More precisely, this precursor makes it possible to selectively obtain a pyrocarbon having a predetermined microstructure according to the temperature imposed during calefaction. The use of the precursor described above makes it possible to modulate the microstructure obtained for the pyrocarbon formed on the treated surface by varying the temperature to which this surface is heated during calefaction.

Furthermore, the alcohol or polyalcohol considered here is a compound that is available in large quantities and can be obtained from renewable resources, thus giving the precursors described above greater availability than known precursors.

In one embodiment, the precursor is an aliphatic alcohol or polyalcohol.

In one embodiment, the precursor is a $C_2$ or $C_3$ alcohol or polyalcohol.

The use of a $C_2$ or $C_3$ precursor is advantageous because it allows, by varying the temperature imposed during calefaction, access to all the existing microstructures for pyrocarbon, and thus in particular to obtain in a controlled manner pyrocarbon of the rough laminar type. In particular, the precursor may be a $C_2$ alcohol or diol. The precursor may be ethanol or propanol.

The pyrocarbon formed from the precursor described above can be used in a variety of applications.

Thus, the invention also relates to a process for coating a substrate, comprising at least the following step:
  forming a pyrocarbon coating on a surface of a substrate by carrying out a process as described above.

Alternatively, the invention further relates to a process for densifying a fiber preform, comprising at least the following step:
  forming a pyrocarbon matrix in the porosity of the fiber preform by carrying out a process as described above.

BRIEF DESCRIPTION OF THE DRAWINGS

Further features and advantages of the invention will be apparent from the following description, which is non-limiting, in reference to the appended FIGS. 1 and 2, which are observations by means of a polarized light optical microscope of a plurality of pyrocarbon deposits obtained as examples of the process according to the invention.

DETAILED DESCRIPTION OF EMBODIMENTS

Figure 1:
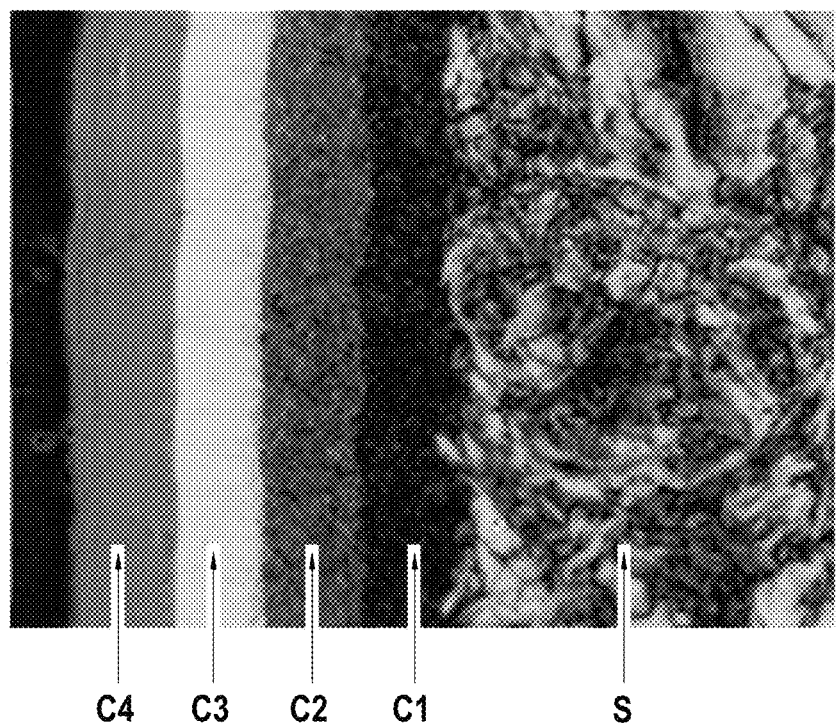

Pyrocarbon is formed by calefaction from a precursor $C_2$ to $C_6$ alcohol or polyalcohol. In particular, a pyrocarbon matrix may be formed in the porosity of a fiber preform, or a pyrocarbon coating may be formed on the outer surface of a substrate.

In this case, the fiber preform to be densified or the substrate to be coated is immersed in a liquid bath comprising the alcohol or polyalcohol precursor. The preform or substrate is then heated, for example by induction. On contact with the heated preform or substrate, the precursor is vaporized to form a calefaction film within which it will decompose to form a pyrocarbon deposit, forming the matrix or coating.

The alcohol or polyalcohol may have a linear, branched or cyclic chain. According to one example, the precursor may be an alcohol or an aliphatic polyalcohol.

In an embodiment, the precursor is selected from: ethanol, ethylene glycol, propanol, glycerol, butanol, pentanol, hexanol, cyclopropanol, cyclobutanol, cyclopentanol, cyclohexanol, a phenol or a mixture of these compounds. The inventors also found that other molecules could be used as a useful precursor to form pyrocarbon by a calefaction process. As such, the precursor may be methanol or an ether, such as ethoxyethane or methoxypropane.

In an embodiment, the alcohol or polyalcohol is a $C_2$ to $C_4$ alcohol or polyalcohol. The alcohol or polyalcohol can be a $C_2$ or $C_3$ alcohol or polyalcohol. In particular, the precursor is ethanol or propanol.

During the calefaction process, a predetermined temperature is imposed on the preform or substrate in order to obtain the pyrocarbon of the desired microstructure.

When a $C_2$-$C_6$ alcohol or polyalcohol precursor is used during calefaction, imposing a first temperature selectively forms a pyrocarbon having a first microstructure, and imposing a second temperature, different from the first, selectively forms a pyrocarbon having a second microstructure, different from the first. Depending on the desired applications for the pyrocarbon formed, it may be desirable to prefer one pyrocarbon microstructure over another.

By way of example, when ethanol is used as precursor:
  amorphous pyrocarbon is obtained by imposing a temperature between 1050° C. and 1150° C. during calefaction,
  dark laminar pyrocarbon is obtained by imposing a temperature between 1175° C. and 1225° C. during calefaction,
  rough laminar pyrocarbon is obtained by imposing a temperature between 1250° C. and 1325° C. during calefaction, and
  smooth laminar pyrocarbon is obtained by imposing a temperature between 1350° C. and 1425° C. during calefaction.

It should be noted that if a $C_2$ precursor is used, it is not only possible to modulate the microstructure of the pyrocarbon according to the temperature imposed during calefaction but also to obtain, in a controlled manner, rough laminar pyrocarbon.

By way of example, when propanol is used as precursor:
  amorphous pyrocarbon is obtained by imposing a temperature between 1050° C. and 1150° C. during calefaction,
  dark laminar pyrocarbon is obtained by imposing a temperature between 1175° C. and 1220° C. during calefaction,
  rough laminar pyrocarbon is obtained by imposing a temperature between 1220° C. and 1250° C., for example between 1230° C. and 1250° C., during calefaction, and
  smooth laminar pyrocarbon is obtained by imposing a temperature between 1275° C. and 1425° C. during calefaction.

It should be noted that if a $C_3$ precursor is used, it is not only possible to modulate the microstructure of the pyrocarbon according to the temperature imposed during calefaction but also to obtain, in a controlled manner, rough laminar pyrocarbon.

By way of example, when butanol is used as precursor:
  amorphous pyrocarbon is obtained by imposing a temperature between 1050° C. and 1150° C. during calefaction, and
  smooth laminar pyrocarbon is obtained by imposing a temperature between 1175° C. and 1225° C. during calefaction.

By way of example, when pentanol is used as precursor:
  dark laminar pyrocarbon is obtained by imposing a temperature between 1050° C. and 1225° C. during calefaction, and
  smooth laminar pyrocarbon is obtained by imposing a temperature between 1275° C. and 1425° C. during calefaction.

By way of example, when hexanol is used as precursor:
  dark laminar pyrocarbon is obtained by imposing a temperature between 1050° C. and 1225° C. during calefaction, and
  smooth laminar pyrocarbon is obtained by imposing a temperature between 1275° C. and 1425° C. during calefaction.

A polarized light optical microscope observation of a result of a test example according to the invention is provided in FIG. 1.

The test corresponding to FIG. 1 consisted in successively depositing by calefaction four layers C1, C2, C3 and C4 of pyrocarbon on the substrate S.

Ethanol was used to form each of the layers C1-C4 as pyrocarbon precursor. A different temperature was imposed during the calefaction when forming each of the layers C1-C4.

Thus, the layer C1 was obtained by imposing a temperature during the calefaction of 1100° C. for 49 minutes. The layer C1 was an amorphous pyrocarbon layer and had a thickness of 7.32 μm and an extinction angle of 1.4° when observed under polarized light optical microscopy.

The layer C2 was obtained by imposing a temperature during the calefaction of 1200° C. for 19 minutes. The layer C2 was a dark laminar pyrocarbon layer and had a thickness of 8.21 μm and an extinction angle of 4.2° when observed under polarized light optical microscopy.

The layer C3 was obtained by imposing a temperature during calefaction of 1300° C. for 7 minutes. The layer C3 was a rough laminar pyrocarbon layer and had a thickness of 7.36 μm and an extinction angle of 21.7° when observed under polarized light optical microscopy.

The layer C4 was obtained by imposing a temperature during the calefaction of 1400° C. for 2 minutes and 12 seconds. The layer C4 was a smooth laminar pyrocarbon layer and had a thickness of 9.02 μm and an extinction angle of 8.4° when observed under polarized light optical microscopy.

Figure 2:
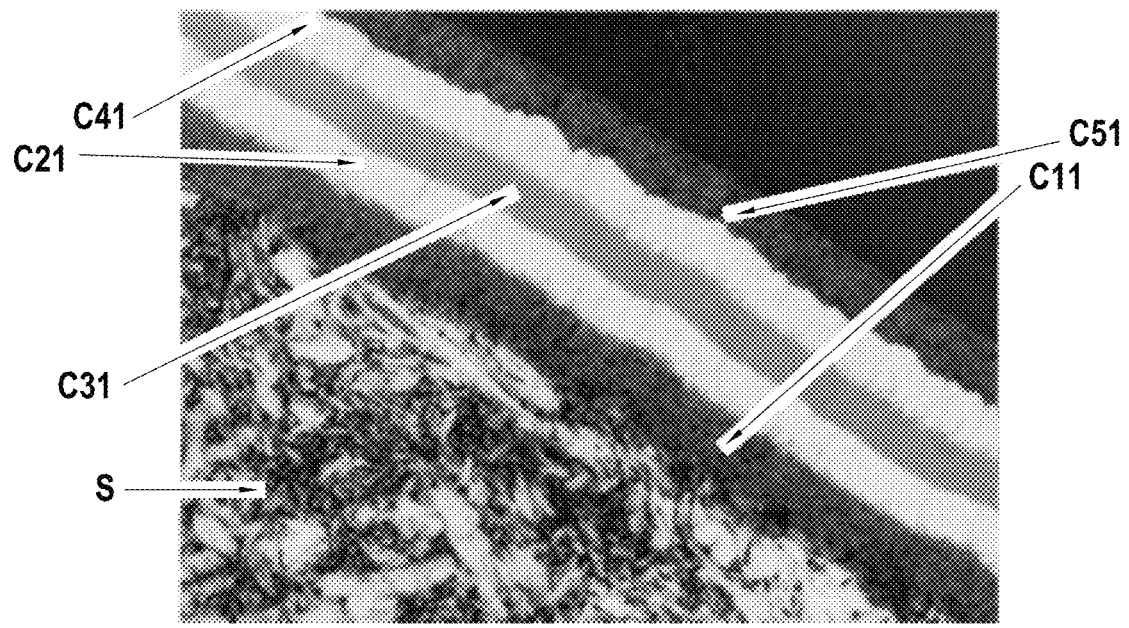

Other tests have been conducted using ethanol as precursor. The test shown in FIG. 2 consisted of the successive calefaction deposition of five pyrocarbon layers C11, C21, C31, C41 and C51 on the substrate S.

The temperature imposed during calefaction was modulated during the deposition of these five layers in order to vary the microstructure of the resulting pyrocarbon.

Thus, the layers C11 and C51 were obtained by imposing a temperature during calefaction of 1200° C. for 13 minutes and 39 seconds. The layers C11 and C51 were dark laminar pyrocarbon layers with a thickness of 5 μm.

The layers C21 and C41 were obtained by imposing a temperature during calefaction of 1300° C. for 5 minutes and 39 seconds. The layers C21 and C41 were rough laminar pyrocarbon layers with a thickness of 4.5 μm.

The layer C31 was obtained by imposing a temperature during calefaction of 1400° C. for 1 minute and 34 seconds. The layer C31 was a smooth laminar pyrocarbon layer and was 4 μm thick.

Details of the fiber preform and to the substrate that can be employed will now be described.

The fiber preform may comprise refractory yarns, such as ceramic or carbon yarns, or a mixture of ceramic and carbon yarns. Ceramic yarns may, for example, be selected from silicon carbide yarns or refractory oxide yarns, for example alumina.

By way of example, the preform can be formed from silicon carbide yarns supplied by the Japanese company NGS under the name "Nicalon", "Hi-Nicalon" or "Hi-Nicalon Type S". The preform can be formed from alumina wire supplied by 3M under the name Nextel. The carbon yarns that can be used to form this preform are, for example, supplied as Torayca T300 3K by Toray.

The fiber preform is obtained from at least one textile operation. The fiber preform is intended to constitute the fiber reinforcement of the part to be obtained. The fiber preform can, in particular, be obtained by multilayer or multidimensional weaving, for example three-dimensional, 3D orthogonal, 3D polar or 4D.

"Three-dimensional weaving" or "3D weaving" is to be understood as a mode of weaving in which at least some of the warp yarns bind weft yarns over several weft layers. A reversal of roles between warp and weft is possible in this text and should be considered as covered also by the claims.

The fiber preform may, for example, have a multi-satin weave, i.e. a fabric obtained by three-dimensional weaving with several layers of weft yarns, the basic weave of each layer being equivalent to a conventional satin-type weave but with certain points in the weave binding the layers of weft yarns together. Alternatively, the fiber preform may have an interlock weave. By "interlock weave or interlock fabric" is meant a 3D weave in which each layer of warp yarns links several layers of weft yarns with all the yarns of the same warp column having the same movement in the plane of the weave. Different modes of multilayer weaving that can be used to form the fiber preform are described in WO 2006/136755.

It is also possible to first form fiber textures such as two-dimensional fabrics or unidirectional webs, and to obtain the fiber preform by draping such fiber textures on a form. These textures can possibly be bonded together, for example by sewing or implanting yarns, to form the fiber preform.

The yarns forming the fiber preform may or may not be coated prior to the formation of the pyrocarbon matrix.

In particular, the yarns can be coated with a single-layer or multi-layer interphase. This interphase may comprise at least one layer of pyrocarbon (PyC), boron nitride (BN), silicon-doped boron nitride (BNSi), with silicon in a mass proportion of between 5% and 40% (the balance being boron nitride) or boron-doped carbon (BC, with 5 at. % to 20 at. % of B, the balance being C).

The role of the interphase here is to make the composite material less fragile, which favors the deflection of possible cracks reaching the interphase after having propagated in the matrix, preventing or delaying the breakage of the yarns by such cracks.

The thickness of the interphase can be between 10 nm and 1000 nm, and for example between 10 nm and 100 nm. The interphase can be formed, in a manner known per se, by chemical vapor infiltration on the yarns of the already formed preform. Alternatively, the interphase could be formed by chemical vapor deposition on the yarns before forming the preform, and then form the preform from the yarns thus coated.

Note that, according to one example, the fiber preform may be partially densified prior to the formation of the pyrocarbon matrix from the precursor. This pre-densification can be carried out in a manner known per se. The fiber preform can be pre-densified by a pre-densification phase in carbon or ceramic material. In this case, the residual porosity of the pre-densified preform is, in whole or in part, filled by the pyrocarbon matrix formed from the precursor. Alternatively, the matrix of the composite material part obtained is integrally formed by the pyrocarbon matrix obtained from the alcohol or polyalcohol precursor. In the latter case, the fiber preform has not been pre-densified.

The matrix formed by a calefaction process from the precursor $C_2$ to $C_6$ alcohol or polyalcohol may occupy at least 50% or even at least 75% of the initial porosity of the fiber preform. The initial porosity of the preform corresponds to the porosity exhibited by the preform before any densification step is carried out.

It is not beyond the scope of the invention when a pyrocarbon coating is formed on the outer surface of the substrate. A coated part is then obtained, comprising the substrate and the pyrocarbon coating formed thereon from the alcohol or polyalcohol precursor.

The coated substrate can be a part made of an already densified composite material, such as a ceramic matrix composite material or a carbon matrix composite material. Alternatively, the coated substrate can be a block of monolithic refractory material, ceramic or carbon.

The phrase "between . . . and . . . " should be understood to include the bounds.

The invention claimed is:

1. A process for manufacturing pyrocarbon, comprising a step of forming pyrocarbon by a calefaction process from at least one $C_2$ to $C_6$ alcohol or polyalcohol precursor, the precursor being ethanol, rough laminar pyrocarbon being obtained by imposing a temperature of between 1250° C. and 1325° C. during calefaction.

2. A process for coating a substrate, comprising at least the following step:
   forming a pyrocarbon coating on a surface of a substrate by carrying out a process as claimed in claim 1.

3. A process for densifying a fiber preform, comprising at least the following step:
   forming a pyrocarbon matrix in the porosity of the fiber preform by carrying out a process as claimed in claim 1.

* * * * *